United States Patent [19]
Yoshida et al.

[11] 3,758,525
[45] Sept. 11, 1973

[54] PROCESS FOR PREPARING N-HIGHER ALIPHATIC ACYL ACIDIC AMINO ACIDS

[75] Inventors: Ryonosuke Yoshida, Kanagawa; Ippei Yoshimura, Tokyo; Masahiro Takehara, Kanagawa, all of Japan

[73] Assignee: Ajinomoto Co., Inc., Tokyo, Japan

[22] Filed: Mar. 20, 1970

[21] Appl. No.: 21,283

[30] Foreign Application Priority Data
Apr. 1, 1969  Japan............................... 44/25036

[52] U.S. Cl.............. 260/402.5, 260/404, 424/319, 252/356, 252/456
[51] Int. Cl................................................ C08h 3/00
[58] Field of Search............... 260/404, 404.5, 402.5

[56] References Cited
UNITED STATES PATENTS
3,624,114  11/1971  Morelle........................... 260/402.5
3,551,419  12/1970  Dare et al. ......................... 260/404

FOREIGN PATENTS OR APPLICATIONS
1,491,262  7/1967  France ............................... 260/404
40/9131    5/1965  Japan.................................. 260/404
158,252    5/1952  Australia............................. 260/404
1,153,408  5/1969  Great Britain...................... 260/404

Primary Examiner—Lewis Gotts
Assistant Examiner—G. Hollvah
Attorney—Kelman and Berman

[57] ABSTRACT

The halides of aliphatic carboxylic acids having 8 to 22 carbon atoms can be reacted with acidic amino acids to form N-acyl amino acids in very good yields if the reaction is carried out in an alkaline solvent medium of 20 – 85 percent (vol.) water and 80 – 15 percent acetone, methylethylketone, dioxane, tetrahydrofuran, tert-butanol, or cyclohexanone.

6 Claims, 5 Drawing Figures

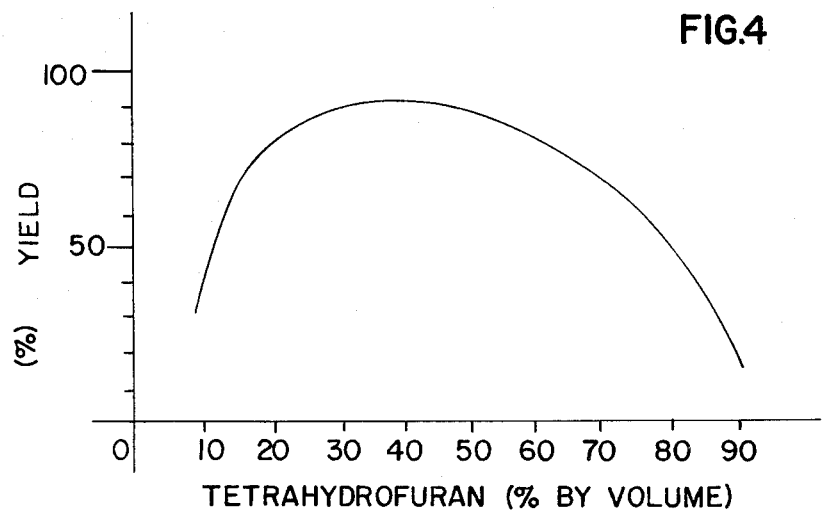
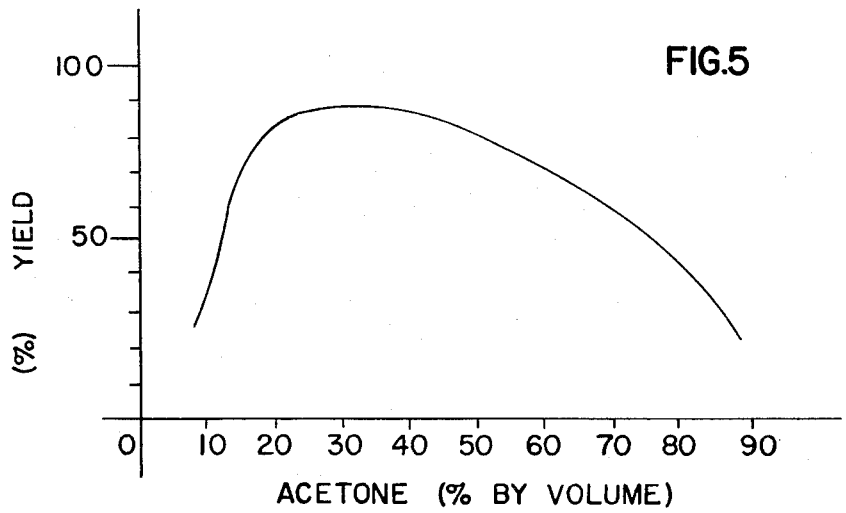

PROCESS FOR PREPARING N-HIGHER ALIPHATIC ACYL ACIDIC AMINO ACIDS

This invention relates to a method of preparing N-acyl amino acids in which the acyl groups are radicals of aliphatic carboxylic acids having 8 to 22 carbon atoms, and particularly to the preparation of N-acyl acidic amino acids.

Inorganic and organic salts of N-acyl acidic amino acids whose acyl groups are radicals of aliphatic carboxylic acids having 8 to 22 carbon atoms are effective surfactants and may have antibacterial effects which make them useful as detergents, dispersing and emulsifying agents, and as bactericidal agents.

N-acylamino acids are conventionally prepared by reaction of amino acids with fatty acid halides in aqueous alkaline media. While the method is used successfully in preparing N-acyl derivatives of neutral amino acids and N-acyl derivatives of acidic amino acids whose acyl groups are radicals of lower aliphatic carboxylic acids and benzoic acid, it does not produce the expected result when the acyl group is the radical of a higher aliphatic carboxylic acid [E. Jungermann et al., J.A.C.S. 78 (1956) 172].

It has therefore been proposed (ibid.) to reflux a suspension of an acidic amino acid and of a halide of a higher fatty acid in anhydrous ethyl acetate. However, the yield is only about 30 percent, and a more successful direct acylation of acidic amino acids to introduce radicals of higher aliphatic carboxylic acids has not been known heretofore.

It is common practice [Japanese Patent Publication 9568/1955; B.Weiss, J.Org, Chem. 24 (1959) 1368] to convert the amino acid to its dialkyl ester which may thereafter be reacted with an acyl halide in an organic solvent in the presence of an organic base. The resulting N-acyl amino acid dialkyl ester is saponified. Because the intermediates must be isolated and purified, and the yield is low, this method is commercially impractical.

It is an object of this invention to provide an economical and efficient method of preparing N-acyl acidic amino acids directly from the acidic amino acids and halides of higher aliphatic carboxylic acids.

It has been found that the desired N-acylamino acids can be prepared in yields higher than 50 percent, and as high as 93.5 percent when acidic amino acids are condensed with halides of saturated or unsaturated aliphatic carboxylic acids having 8 to 22 carbon atoms in the presence of a base in a solvent mixture of 20 – 85 volume percent water and 80 to 15 volume percent of a water miscible organic solvent which is acetone, methylethylketone, dioxane, tetrahydrofuran, tert-butanol, or cyclohexanone.

The composition of the solvent mixture has an important bearing on the yield of the desired N-acyl amino acid. The effect of solvent composition on the yield is illustrated in the drawing in which:

FIG. 4 shows the effect of tetrahydrofuran concentration in the medium on the reaction between L-glutamic acid and lauroyl chloride; and FIG. 5 illustrates the relationship between the water-acetone distribution in the reaction medium and the yield of N-lauroyl-N-aspartic acid.

Figure 1:
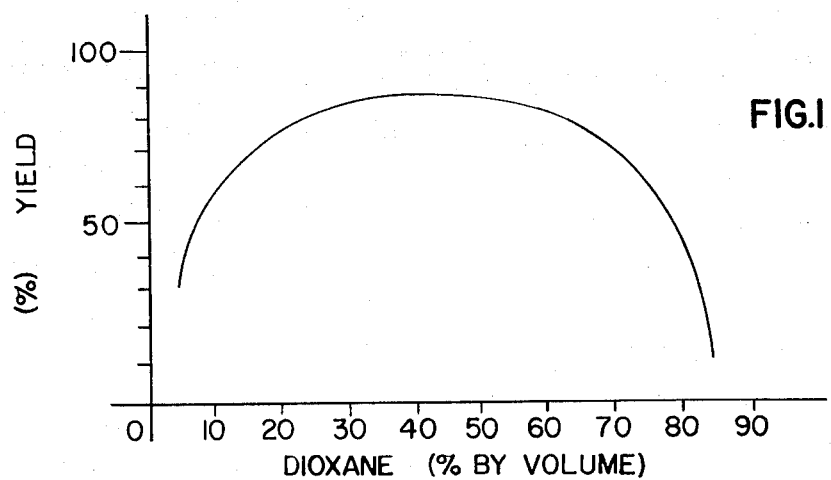
FIG. 1 shows the yield of N-lauroyl-DL-glutamic acid from lauroyl chloride and DL-glutamic acid as a function of the composition of a water-dioxane solvent mixture employed as a reaction medium.

As is evident from the drawing, the concentration of the water-miscible organic solvent must be maintained between 15 and 80 percent by volume, and should be 20 – 60 percent for best results. A marked decrease of N-acyl amino acid yield occurs at less than 15 percent and more than 80 percent organic solvent.

The N-acyl acidic amino acids are prepared according to this invention by suspending or dissolving a dibasic salt of the acidic amino acid in the aqueous solvent mixture, and by adding the acyl halide simultaneously with a calculated amount of base drop by drop. Best results are obtained when the reaction is carried out at a pH not exceeding 13.0, and preferably between about 11.0 and about 13.0. The acylation reaction takes place between -20°C. and the refluxing temperature of the reaction mixture, and temperatures between −10° and 40°C. are preferred. The mixture may also be refluxed after the addition of acid halide and base.

The reaction may be performed with aspartic acid, glutamic acid, aminoadipic acid, N-monoalkylaspartic acid, N-monoalkylglutamic acid, cysteic acid, and homocysteic acid. The reaction products obtained from aspartic and glutamic acid are of particular practical and economical significance. Suitable neutralizing agents include inorganic bases such as sodium or potassium hydroxide, sodium carbonate and bicarbonate, and organic bases such as triethylamine or pyridine. Sodium and potassium hydroxide are most practical.

The acyl halides may be derived from saturated or unsaturated aliphatic carboxylic acids having 8 to 22 carbon atoms and include octanoyl, nonanoyl, decanoyl, undecanoyl, lauroyl, tridecanoyl, myristyl, pentadecanoyl, palmityl, stearyl, margaryl, nonadecanoyl, arachidyl, oleyl, undecylenyl, elaidyl, ricinoleyl, palmitoleyl, erucyl, and linoleyl chloride. Although the chlorides are preferred, the corresponding bromides and iodides may also be employed. Moreover, commercially available mixtures of aliphatic carboxylic acid chlorides may be used such as those derived from coconut oil, lard, linseed oil, corn oil, mustard oil, olive oil, palm oil, poppy seed oil tallow, hydrogenated tallow, whale oil, soybean oil, and cottonseed oil.

After completion of the acylation reaction, the reaction mixture is adjusted to a pH below 2 with a mineral acid, such as hydrochloric or sulfuric acid, whereby the N-acyl amino acid is precipitated in the form of crystals which may be recovered by filtering or decanting. If the N-acyl amino acid should remain dissolved in the acidified reaction mixture, it may be crystallized by evaporation of the organic solvent.

When the reaction mixture is neutralized to pH 5 – 6, the N-acyl amino acid is precipitated in the form of its salt. The free acids and the salts may be obtained in a purity of more than 98 percent and in a yield of more than 80 percent by washing the crude crystals with petroleum benzine.

The following examples are further illustrative of this invention.

EXAMPLE 1

14.7 g (0.1 Mole) DL-glutamic acid were suspended in 140 ml of a 1:1 (vol.) mixture of water and dioxane, and 8.0 g (0.2 mole) sodium hydroxide were added to form a solution of disodium DL-glutamate. While the solution was held at 0°C., 6.0 g (0.15 mole) sodium hydroxide in 20 ml water and 25 g (0.11 mole) lauroyl chloride were added dropwise and simultaneously with stirring over a period of about 40 minutes. Stirring at 0°C. was then continued for 2 hours.

50 Ml water and thereafter 40 ml 6N hydrochloric acid were added to the reaction mixture to bring the pH to 1. Crude crystals of N-lauroyl-DL-glutamic acid precipitated, and were filtered off and dried (32.4 g). They were washed in 300 ml petroleum benzine and 27.7 g of the pure acid were recovered by filtration (84.3 percent yield). M.P.119.5°–121.5°C. The compound was identified by elementary analysis:

Calculated for $C_{17}H_{31}O_5N$: 61.98% C; 9.49% H; 4.25% N
Found: 59.55% C; 9.73% H; 4.28% N When the ratio of water and dioxane in the reaction medium was varied, the yield varied as shown graphically in FIG. 1.

EXAMPLE 2

A solution of disodium DL-glutamate was formed by adding 8.0 g sodium hydroxide to a suspension of 14.7 g DL-glutamic acid in 72 ml water and 48 ml acetone. 6 g Sodium hydroxide in 20 ml water and 25.0 g lauroyl chloride were added dropwise at 0°C. over a period of 30 minutes, and 34.3 g crude crystalline N-lauroyl-DL-glutamic acid were recovered as in Example 1. After washing in petroleum benzine, 30.4 g of the pure acid (92.1 percent yield) melting at 118.5° – 120°C. were obtained.

Figure 2:
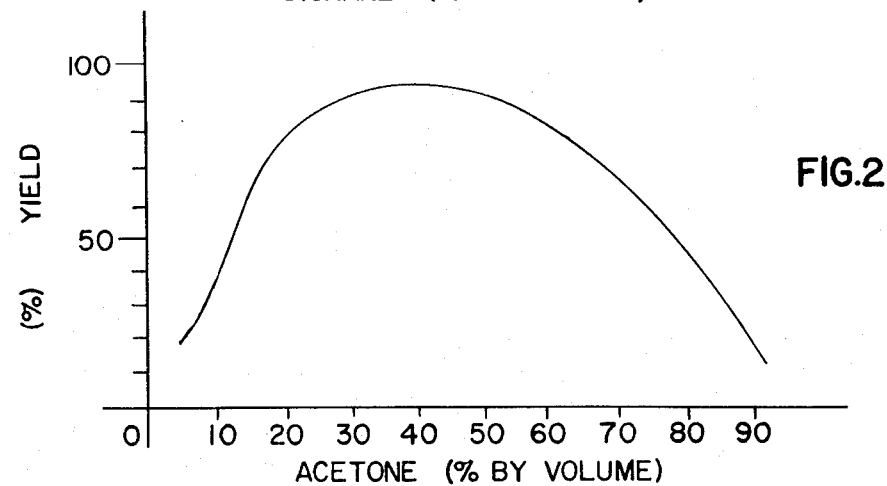
FIG. 2 shows the same yield as a function of the composition of a water-acetone mixture.

The variation of the yield with a varying ratio of acetone and water in the reaction medium is illustrated in FIG. 2.

EXAMPLE 3

A disodium DL-glutamate solution was prepared from 14.7 g DL-glutamic acid and 8.0 g sodium hydroxide in a mixture of 30 ml acetone and 70 ml water. 25.0 g (0.11 mole) Coconut oil fatty acid chloride and 6.0 g sodium hydroxide in 20 ml water were added simultaneously and dropwise to the solution with stirring over a period of 30 minutes while the solution was cooled in an ice water bath. Stirring was continued at 0°C. for 2 hours, and the reaction mixture was diluted with 50 ml water and acidified to pH 1 with 6N hydrochloric acid to precipitate crystalline N-acyl-DL-glutamic acid which weighed 31.7 g when dried. A small amount of coconut oil fatty acid was removed by washing with petroleum benzine, and 28.7 g purified DL-glutamic acid, N-substituted with acyl radicals of coconut oil fatty acids was obtained (81.0 percent yield). M.P.102° – 108°C.

Figure 3:
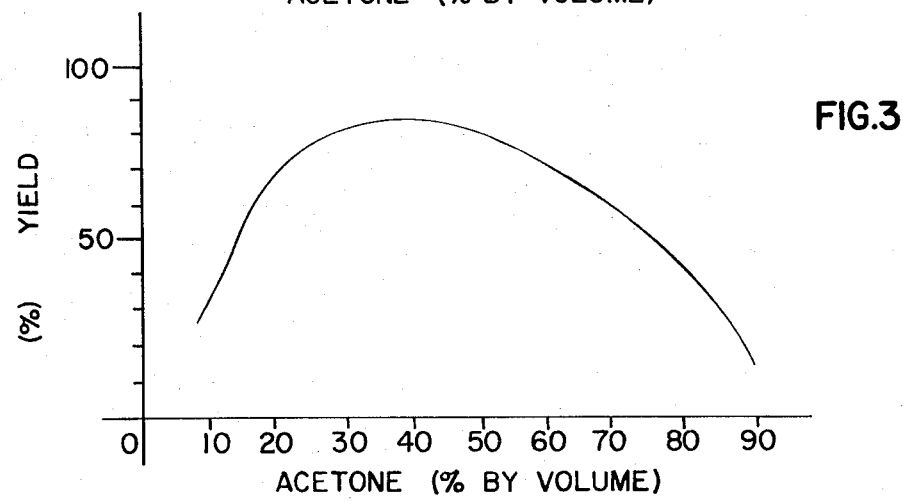
FIG. 3 illustrates the yield of N-acyl-DL-glutamic acid in which the acyl group is derived from coconut oil fatty acid when the acylation is performed in acetone-water mixtures of different concentration.

FIG. 3 shows the variation in the yield with changes in the ratio of water and acetone in the reaction medium.

EXAMPLE 4

16.0 g Sodium hydroxide were added to a suspension of 29.4 g (0.2 mole) L-glutamic acid in a mixture of 116 ml water and 84 ml tetrahydrofuran. 48.3 g (0.22 mole) lauroyl chloride and 12.0 g sodium hydroxide in 40 ml water were added over a period of 30 minutes to the disodium L-glutamate solution as in the preceding examples, and the reaction mixture was acidified to precipitate crystalline N-lauroyl-L-glutamic acid after an additional hour of stirring. When filtered off and dried, the crystals weighed 69.5 g.

When washed with petroleum benzine to remove a small amount of lauric acid, the purified crystals weighed 59.2 g (90.0 percent yield) and melted at 100° – 104°C. $[\alpha]_D^{25.0} = -7.3$ (C=5N NaOH).

The variation in the yield of N-lauroyl-L-glutamic acid with varying ratios of water and tetrahydrofuran in the reaction medium is shown in FIG. 4.

EXAMPLE 5

8.0 g Sodium hydroxide were added to a suspension of 13.3 g (0.1 mole) L-aspartic acid in 48 ml acetone and 72 ml water. The resulting solution of disodium aspartate was cooled to 0°C., and 6.0 g sodium hydroxide in 20 ml water and 25.0 lauroyl chloride were added over 30 minutes as described above. After further stirring for 2 hours, the mixture was refluxed for 1 hour. Thereafter, it was diluted with 300 ml water and acidified to pH 1. Crude crystalline N-lauroyl-L-aspartic acid precipitated and was recovered (32.5 g). After washing with petroleum benzine, the yield was 28.5 g (90.5 percent). M.P. 92° – 100°C.

The variation of the yield with varying water:acetone ratio in the reaction medium is shown in FIG. 5.

EXAMPLE 6

Dioxane was replaced in the procedure of Example 1 with methylethylketone, cyclohexanone, and tert-butanol respectively. The crude crystals recovered weighed 32.6, 32.5, and 32.1 g respectively, and the pure crystals 27.4, 27.2, and 26.7 g for yields of 83.2, 82.7, and 80.0 percent. Methylethylketone and cyclohexanone formed two layers with water under the conditions of Example 1.

EXAMPLE 7

In the procedure of Example 2, the sodium hydroxide added simultaneously with the lauroyl chloride was replaced by 15.2 g (0.15 mole) triethylamine. After the addition, the mixture was stirred for 1 additional hour, diluted with 50 ml water, and acidified to pH 1 with 6N hydrochloric acid. The precipitated crude crystals weighed 36.5 g. After washing with petroleum benzine, 30.7 g purified N-lauroyl-DL-glutamic acid (93.5 percent yield) were obtained. M.P.118° – 119.5°C.

EXAMPLE 8

A solution of di-potassium L-glutamate was prepared from 14.7 g L-glutamic acid in 70 ml water and 70 ml acetone and 11.3 g potassium hydroxide. 6.8 g (0.12 mole) potassium hydroxide in 20 ml water and 30.3 g (0.1 mole) stearyl chloride were added simultaneously and dropwise with stirring at 30°C. over a period of 30 minutes, and stirring was continued at room temperature for 1 hour. The reaction mixture was diluted with 300 ml water and acidified with 6N hydrochloric acid to pH 1. The precipitated crystals of crude N-stearyl-L-glutamic acid were filtered off and dried, and weighed 40.0 g. When washed with petroleum benzine, they weighed 35.2 g (85 percent yield) and melted at 110° – 120°C. Degree of acidity: 99.0 percent.

EXAMPLE 9

A solution of sodium DL-glutamate prepared from 14.7 g DL-glutamic acid in 48 ml acetone and 72 ml water with 8.0 g sodium hydroxide was mixed dropwise and simultaneously at 30°C. with 32.6 g (0.11 mole) beef tallow fatty acid chloride and a solution of 6 g sodium hydroxide in 20 ml water. The reaction mixture was further stirred for 1.5 hours at room temperature, cooled, and acidified to pH 1 with 6N sulfuric acid. The precipitated crude crystals of N-acyl-DL-glutamic acid, when filtered off and dried, weighed 42.0 g. After washing with petroleum benzine, they weighed 31.4 g (70.5 percent yield) and were 99 percent pure. M.P. 100° – 105°C.

EXAMPLE 10

A solution of dipotassium DL-aspartate was prepared from 13.3 g DL-aspartic acid in 60 ml tetrahydrofuran and 60 ml water and 11.3 g potassium hydroxide. 25.0 g Beef tallow fatty acid chloride and 8.4 g potassium hydroxide in 20 ml water were added simultaneously and drop by drop at 30°C. over a period of 40 minutes. Stirring then was continued for 1 hour. Crude crystals of N-acyl-DL-aspartic acid were precipitated from the cooled reaction mixture with 2N hydrochloric acid at pH 1. 30.2 g crystals of 99 percent purity (83 percent yield) melting at 85° – 93°C. were obtained by washing the crude crystals with petroleum benzine.

EXAMPLE 11

To a solution prepared from 35.3 g (0.24 Mole) L-glutamic acid in 140 ml water and 120 ml acetone and 19.2 g sodium hydroxide, 60.2 g (0.2 mole) oleyl chloride and 8.0 g sodium hydroxide in 20 ml water were added with stirring at 30°C. and pH 12 over a period of 20 minutes. The reaction mixture was stirred 1 hour longer, cooled, and acidified to pH 1 with 6N sulfuric acid. The precipitated crystals of N-oleyl-L-glutamic acid were filtered off, dried, and washed with petroleum benzine. The yield of pure crystals was 70.0 g (85.0 percent based on the oleyl chloride). M.P. 87°–92°C. $[\alpha]_D^{20} = -5.8$ ($c=2$ g/dl, methanol).

EXAMPLE 12

A solution of disodium L-glutamate was prepared from 35.3 g (0.24 mole) L-glutamic acid, 100 ml water, 100 ml acetone, and 19.2 g sodium hydroxide, and was mixed over a period of 20 minutes at 30°C. with 59.0 g (0.2 mole) soybean oil fatty acid chloride and 8.0 g sodium hydroxide in 20 ml water. The mixture was stirred for one hour at room temperature, cooled, and acidified to pH 1 with 6N sulfuric acid to precipitate crystals of N-acyl-L-glutamic acid. The crystals was filtered off, dried, and washed with petroleum benzine. The yield of purified material was 71.5 g (88.0 percent based on the acid chloride used). M.P.83° –90°C.

EXAMPLE 13

A solution prepared from 35.3 g (0.24 mole) L-glutamic acid in 110 ml water and 110 ml acetone and 19.2 g sodium hydroxide was mixed at 30°C. over a period of 20 minutes with 57.5 g (0.2 mole) corn oil fatty acid chloride and 8.0 g sodium hydroxide in 20 ml water. After 1 additional hour of stirring at room temperature, the reaction mixture was cooled, acidified to pH 1 with 6N sulfuric acid, and 66 g N-acyl L-glutamic acid crystals were obtained from the precipitated material by washing with petroleum benzine. The yield was 83 percent based on the acid chloride. M.P.85° – 91°C.

EXAMPLE 14

18.3 g (0.1 Mole) DL-homocysteic acid were suspended in 70 ml each of water and acetone, and neutralized with 8.0 g sodium hydroxide. The solution was mixed with 27.5 g (0.1 mole) palmityl chloride and 4.2 g sodium hydroxide at 20° – 30°C. over a period of 30 minutes. After further stirring at room temperature for 1 hour, the mixture was cooled and acidified to pH 3 with 6N sulfuric acid. The precipitated crystalline monosodium salt of N-palmityl-DL-homocysteic acid was filtered off, dried, and washed with petroleum benzine. It weighed 54.8 g (81 percent yield). M.P.215° – 220°C. (decomp.).

EXAMPLE 15

16.1 g (0.1 Mole) N-methyl-DL-glutamic acid were dissolved in a mixture of equal volumes of water and acetone and neutralized with 4.0 g sodium hydroxide. 21.9 g (0.1 mole) lauroyl chloride and 4.2 g sodium hydroxide were added with stirring at 0°C. during 30 minutes. After further stirring at room temperature for 1 hour, the reaction mixture was cooled and acidified to pH 1 with 6N sulfuric acid. The precipitated crude N-lauroyl-N--methyl-DL-glutamic acid was filtered off, dried, and washed with petroleum benzine. The yield of the purified product was 27.5 g (80 percent). M.P.86°–90°C.

We claim:

1. In a method of preparing an N-acyl amino acid by reacting aspartic acid, glutamic acid, aminoadipic acid, N-mono-lower-alkyl-aspartic acid, N-mono-lower-alkyl-glutamic acid, cysteic acid, or homocysteic acid with an acyl halide of an aliphatic, hydrocarbyl monocarboxylic acid having 8 to 22 carbon atoms in a liquid medium, the improvement which consists in said medium essentially consisting of 20 to 85 volume percent water, 80 to 15 volume percent of an organic solvent selected from the group consisting of acetone, methylethylketone, dioxane, tetrahydrofuran, tert-butanol, and cyclohexanone, and an amount of an alkaline material sufficient to make said medium alkaline, said material being sodium hydroxide, potassium hydroxide, sodium carbonate, sodium bicarbonate, triethylamine, or pyridine, and the halide moiety of said acyl halide being chlorine, bromine, or iodine, the reaction being continued until said N-acyl amino acid is formed.

2. In a method as set forth in claim 1, said halide moiety being chlorine.

3. In a method as set forth in claim 2, said medium essentially consisting of 40 to 80 volume percent water, 60 to 20 volume percent of said solvent, and said alkaline material.

4. In a method as set forth in claim 2, said medium containing an amount of alkaline material sufficient to make the pH thereof 11.0 to 13.0.

5. In a method as set forth in claim 2, said medium having a temperature between −20°C and the refluxing temperature of the reaction mixture.

6. In a method as set forth in claim 2, the formed N-acyl amino acid being recovered from said medium.

* * * * *